US008027750B2

(12) United States Patent
Orita et al.

(10) Patent No.: US 8,027,750 B2
(45) Date of Patent: Sep. 27, 2011

(54) ROBOT CONTROL APPARATUS

(75) Inventors: Atsuo Orita, Wako (JP); Naoaki Sumida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 970 days.

(21) Appl. No.: 11/664,004

(22) PCT Filed: Oct. 3, 2005

(86) PCT No.: PCT/JP2005/018265
§ 371 (c)(1),
(2), (4) Date: Jun. 5, 2007

(87) PCT Pub. No.: WO2002/038576
PCT Pub. Date: Apr. 13, 2006

(65) Prior Publication Data
US 2008/0109114 A1 May 8, 2008

(30) Foreign Application Priority Data
Oct. 1, 2004 (JP) ................................. 2004-289623

(51) Int. Cl.
*G05B 19/19* (2006.01)
*H02J 7/00* (2006.01)
(52) U.S. Cl. ........ 700/253; 700/245; 700/248; 320/107; 320/138
(58) Field of Classification Search .................. 320/107, 320/128, 138, 155; 705/7; 718/103, 104; 701/123; 700/245, 100, 101, 248, 253
See application file for complete search history.

(56) References Cited

U.S. PATENT DOCUMENTS

| 4,761,745 | A  | * | 8/1988  | Kodaira ......................... 700/254 |
| 5,220,263 | A  | * | 6/1993  | Onishi et al. .................. 318/587 |
| 5,329,450 | A  | * | 7/1994  | Onishi ............................ 701/24 |
| 5,367,456 | A  | * | 11/1994 | Summerville et al. .......... 701/24 |
| 6,498,454 | B1 | * | 12/2002 | Pinlam et al. ................. 320/107 |
| 6,625,539 | B1 | * | 9/2003  | Kittell et al. .................. 701/213 |
| 7,071,648 | B2 | * | 7/2006  | Tsurumi .................. 318/568.12 |
| 7,136,715 | B2 | * | 11/2006 | Cho .............................. 700/100 |
| 7,206,753 | B2 | * | 4/2007  | Bancroft et al. ................ 705/10 |
| 2002/0095239 | A1 | * | 7/2002 | Wallach et al. ............... 700/245 |
| 2002/0144167 | A1 | * | 10/2002 | Kobayashi et al. ........... 713/340 |
| 2004/0225394 | A1 | * | 11/2004 | Fromherz et al. ............. 700/101 |
| 2007/0142972 | A1 | * | 6/2007 | Abramson et al. ............ 700/259 |
| 2008/0231227 | A1 | * | 9/2008 | Kumhyr ........................ 320/106 |

FOREIGN PATENT DOCUMENTS
JP          5-73142        3/1993
(Continued)

*Primary Examiner* — Christine Behncke
(74) *Attorney, Agent, or Firm* — Squire, Sanders & Dempsey (US) LLP

(57) ABSTRACT

A robot control apparatus (3) for controlling tasks to be executed by a plurality of robots which are capable of moving. The robot control apparatus (3) includes: a battery level determination device (330) which determines a battery level of each robot from a predetermined plurality of battery levels based on a remaining amount of charge in a battery of each robot; a task manager (340) which sets a task executive plan to be executed by each robot for the plurality of robots and rearranges the task executive plan for one or more tasks registered in the task executive plan in accordance with a process predetermined for each battery level; an executive instruction generator (350) which generates executive instructions requesting the robots to execute the tasks that are set in the task executive plans; and a transmitter which transmits the executive instructions to the robots.

4 Claims, 10 Drawing Sheets

FOREIGN PATENT DOCUMENTS

| | | |
|---|---|---|
| JP | 2000-042959 | 2/2000 |
| JP | 2000-42959 | 2/2000 |
| JP | 2001-92529 | 4/2001 |
| JP | 2005-262378 | 9/2005 |

\* cited by examiner

FIG. 4

220 TASK INFORMATION DATABASE

| TASK ID | PRIORITY | IMPORTANCE | ROBOT ID | CONTENT | START POSITION | END POSITION | NECESSARY TIME | START TIME | END TIME | STATUS |
|---|---|---|---|---|---|---|---|---|---|---|
| 1 | | 1 | | Guide | www, xxx, yyy | ooo, ppp, qqq | 3 | 10:27 | 10:30 | Finished |
| 2 | | 3 | | Guide | | | 5 | 10:40 | 10:45 | Standby |
| 3 | | 2 | | Porter | | | 10 | 10:45 | 10:55 | Reserved |
| 4 | | 4 | | Guide | | | 5 | 10:45 | 10:50 | Reserved |
| ... | ... | ... | ... | ... | ... | ... | ... | ... | ... | ... |
| 10 | | 3 | | Porter | ooo, ooo, ooo | xxx, yyy, zzz | 5 | 11:00 | 11:05 | Unexecuted |
| ... | ... | ... | ... | ... | ... | ... | ... | ... | ... | ... |

FIG. 5

230 TASK SCHEDULE TABLE

| ROBOT ID | ID=1 | | | | ID=2 | |
|---|---|---|---|---|---|---|
| EXECUTION ORDER | TASK ID | PRIORITY | CONTENT | STATUS | TASK ID | PRIORITY |
| 1 | 3 | 3 | Porter | Under execution | 4 | 7 |
| 2 | 7 | 4 | Guide | Reserved | 6 | 2 |
| 3 | ... | ... | ... | ... | ... | ... |

FIG. 7

220 TASK INFORMATION DATABASE

| TASK ID | PRIORITY | IMPORTANCE |
|---|---|---|
| ⋮ | ⋮ | |
| 10 | 3 | |
| 11 | 1 | |
| 12 | 4 | |
| 13 | 1.5 | |
| 14 | 5 | |
| 15 | 3 | |
| ⋮ | ⋮ | |

FIG. 8

| COMBINATION | ROBOT R1 | | | | ROBOT R2 | | | |
|---|---|---|---|---|---|---|---|---|
| | 1 | 2 | 3 | 4 | 1 | 2 | 3 | 4 |
| 1 | | | | | ⑫ | ⑭ | | |
| 2 | | | | | ⑭ | ⑫ | | |
| 3 | ⑫ | | | | ⑭ | | | |
| 4 | ⑭ | | | | ⑫ | | | |
| 5 | ⑫ | ⑭ | | | | | | |
| 6 | ⑭ | ⑫ | | | | | | |

FIG. 9

220 TASK INFORMATION DATABASE

| TASK ID | PRIORITY | IMPORTANCE | ROBOT ID | CONTENT | START POSITION | END POSITION | NECESSARY TIME | START TIME | END TIME | STATUS |
|---|---|---|---|---|---|---|---|---|---|---|
| 1 | | 1 | | Guide | www, xxx, yyy | ooo, ppp, qqq | 3 | 10:27 | 10:30 | Finished |
| 2 | | 3 | | Guide | | | 5 | 10:40 | 10:45 | Standby |
| 3 | | 2 | | Porter | | | 10 | 10:45 | 10:55 | Reserved |
| 4 | | 4 | | Guide | | | 5 | 10:45 | 10:50 | Reserved |
| ... | ... | ... | ... | ... | ... | ... | ... | ... | ... | ... |
| 10 | 4 | 3 | | Porter | ooo, ooo, ooo | xxx, yyy, zzz | 5 | 11:00 | 11:05 | Under execution |
| ... | ... | ... | ... | ... | ... | ... | ... | ... | ... | ... |
| 18 | 9 | 5 | 1 | Charge | xxx, yyy, zzz | ααα, ββ, γγγ | 3 | 11:05 | 11:08 | Unexecuted |
| ... | ... | ... | ... | ... | ... | ... | ... | ... | ... | ... |

FIG. 10

230 TASK SCHEDULE TABLE (a)

| ROBOT ID | ID=1 | | | | ID=2 |
|---|---|---|---|---|---|
| EXECUTION ORDER | TASK ID | PRIORITY | CONTENT | STATUS | TASK ID |
| 1 | 10 | 4 | Porter | Under execution | |
| 2 | | | | | |
| 3 | | | | | |
| ... | ... | ... | ... | ... | ... |

230 TASK SCHEDULE TABLE (b)

| ROBOT ID | ID=1 | | | | |
|---|---|---|---|---|---|
| EXECUTION ORDER | TASK ID | PRIORITY | CONTENT | STATUS | |
| 1 | 10 | 4 | Porter | Under execution | |
| 2 | 18 | 9 | Charge | Reserved | |
| 3 | | | | | |
| ... | ... | ... | ... | ... | ... |

ROBOT CONTROL APPARATUS

TECHNICAL FIELD

The present invention relates to a robot control apparatus which controls a plurality of autonomous mobile robots to perform one or more tasks. More particularly, the present invention relates to a robot control apparatus which controls a plurality of autonomous mobile robots to effectively perform a plurality of tasks, by reevaluating the execution order of the tasks assigned to the autonomous mobile robots, changing the tasks, and reassigning the tasks to other autonomous mobile robots, based on the remaining amount of charge in a battery of each autonomous mobile robot as a power source of the robot.

BACKGROUND OF THE INVENTION

In recent years, attempts have been made to execute various operations (hereinafter referred to as "task(s)") such as a porter's service, a receptionist's service, and a guide service, using an autonomous mobile robot (hereinafter just referred to as "mobile robot(s)"), and these attempts have been come into practical use in various fields.

For example, Japanese Laid-open Patent Application No. 2001-92529 discloses a battery charge controlling system for mobile robots which carry and deliver burdens or baggage in a manufacturing factory where FA (factory automation) is introduced.

In this battery charge controlling system, a host computer controls traffic of the mobile robots, so that each mobile robot is controlled under instructions from the host computer and operates to carry and deliver burdens or baggage or to move to a battery charge station.

These mobile robots perform a porter's service in a factory where the environment such as temperature and humidity are kept constant, and their traveling passages or targeting locations are determined in advance. Therefore, the amount of battery expense to be consumed by the mobile robot (battery consumption) may be more or less in the range of prediction, so that the mobile robot hardly stops during its travel for carrying and delivering burdens or baggage due to the lack of battery charge.

Meanwhile, in the mobile robots performing tasks such as a receptionist's service and a guide service under the environment where human exists, there may be a necessity for a frequent response to human interaction (human interaction response) during the execution of the tasks because of the existence of human.

For instance, if a human exists or baggage is placed on a traveling passage along which a mobile robot moves, it is necessary for the mobile robot to execute a response (human interaction response) for changing the traveling passage to keep away from the human or baggage.

Further, when the mobile robot is under execution of a task such as passing baggage to a particular person (baggage delivering task), the person to whom the mobile robot has to pass the baggage (i.e., target person) may not always stay in the same location. In this case, the mobile robot has to continue the human interaction response until the mobile robot reaches the target person.

In this manner, if the mobile robot executes a human interaction response during the execution of task, the amount of battery expense required for this human interaction response is added further to the amount of battery expense required for the execution of the task. This amount of battery expense for the human interaction response is much different depending on the human interaction response to be executed. It is therefore difficult to predict the amount of battery expense (battery consumption) to be consumed by the mobile robot during the execution of the task.

As described above, because of this unexpected factor as the human interaction response, it is impossible to generally predict the battery consumption when a mobile robot performs the task. Therefore, in the case of the mobile robots performing tasks under the environment where human exists, compared with the mobile robots traveling in a factory, it is more liable to occur disadvantages that the task cannot be executed or all the tasks assigned to the mobile robot cannot be executed due to lack of the battery in the halfway of the task.

In view of this, there is a demand for an apparatus which controls a plurality of mobile robots to effectively perform a plurality of tasks even in the condition where an unexpected factor such as human interaction response exists. Namely, there is a strong need to provide a robot control apparatus which allows a plurality of mobile robots to effectively perform a plurality of tasks based on the remaining amount of charge in the battery of each mobile robot as a power source of the robot, by reevaluating the execution order of the tasks assigned to each robot, rearranging unexecuted tasks to other mobile robots, and reassigning the unexecutable task (task determined to be difficult for execution) to another mobile robot.

SUMMARY OF THE INVENTION

The present invention relates to a robot control apparatus which controls tasks to be executed by a plurality of robots which are capable of moving. The robot control apparatus comprises: a battery level determination device which determines a battery level of each robot from a predetermined plurality of battery levels based on a remaining amount of charge in a battery of each robot; a task manager which sets a task executive plan to be executed by each robot for the plurality of robots and rearranges the task executive plan for one or more tasks registered in the task executive plan in accordance with a process predetermined for each battery level; an executive instruction generator which generates executive instructions requesting the robots to execute the tasks that are set in the task executive plans; and a transmitter which transmits the executive instructions to the robots.

In this robot control apparatus, when the task manager rearranges the tasks registered in the task executive plan, the task manager may preferably register one or more tasks that are determined to be difficult for execution in one or more task executive plans of other robots.

Further, the battery level determination device of the robot control apparatus may comprise: a battery charge determination unit which determines whether or not each robot requires battery charge (replacement and/or recharge) based on the remaining amount of charge in the battery; a battery charge area selection unit which selects one battery charge area among a predetermined plurality of battery charge areas if it is determined that a robot requires battery charge, and sets the selected battery charge area as a target traveling area of the robot; and a battery level determination unit which compares the remaining amount of charge in the battery of the robot with a threshold that is calculated in consideration given to one of an amount of battery expense required for the robot to complete a currently executing task and an amount of battery expense required for the robot to move to the target traveling area, and determines to which level status of the battery belongs among the predetermined plurality of battery levels.

Preferably, the battery charge area selection unit may set the target traveling area based on a current position of the robot or a task end position where the robot finishes the currently executing task.

Further, if the battery charge determination unit determines that the robot requires battery charge, the task manager may preferably register a traveling task requesting the robot to move to the target traveling area in the task executive plan of the robot.

The robot control apparatus according to the present invention performs to reevaluate the execution order of the tasks registered in the task executive plan of each robot, to change the tasks, and to reassign the one or more tasks that are determined to be difficult for one of the robot to execute to other robots (or another robot) based on the remaining amount of charge in the battery as a power source of each robot, so that a plurality of robots can effectively perform a plurality of tasks. Therefore, it is possible to control a plurality of robots to effectively perform a plurality of tasks even in the condition where an unexpected factor such as human interaction response exists.

BRIEF DESCRIPTION OF THE DRAWINGS

FIG. 4 explains one example of an information item of a task information database 220.

FIG. 5 is explains one example of a task schedule table 230.

FIG. 7 explains a process performed by a task schedule production unit 341.

FIG. 8 explains a process performed by the task schedule production unit 341.

FIG. 9 explains an example of the task information database 220 when a battery reservation task is registered.

FIG. 10(a) shows an example of the task schedule table 230 before registration of the battery reservation task, and FIG. 10(b) shows an example of the task schedule table 230 when the reservation task is registered.

BEST MODE FOR CARRYING OUT THE INVENTION

Figure 1:
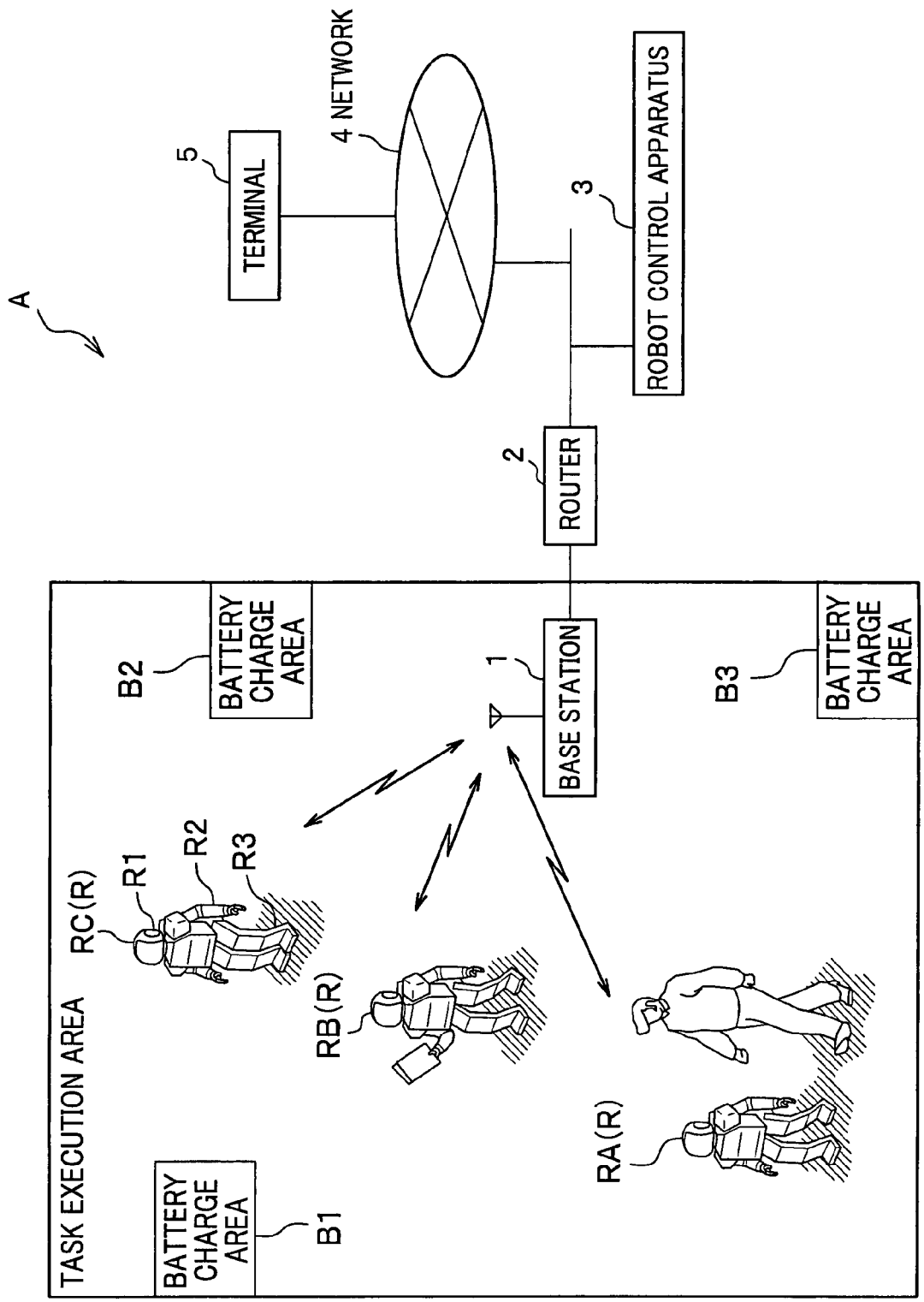
FIG. 1 shows a system configuration of a robot control system A according to one preferred embodiment of the present invention.

Preferred embodiment of the present invention will be described in detail with reference made to the accompanying drawings where appropriate. FIG. 1 shows a system configuration of a robot control system according to one preferred embodiment of the present invention.
Configuration of Robot Control System Referring now to FIG. 1, a robot control system which incorporates a robot control apparatus according to one preferred embodiment of the present invention will be described in detail.

As shown in FIG. 1, the robot control system A includes a plurality of robots RA, RB and RC which are capable of moving. Note that when an unspecified robot or robots are generally referred to, the robot(s) will be designated simply by "R". Each robot R is configured to carry out a task (or a series of tasks) in accordance with a task executive plan (task schedule) which has been organized for each robot R and stored in a robot control apparatus 3. The robot control system A is implemented by rearranging tasks registered in a task schedule based on the remaining amount of charge in a battery of each robot R so that a plurality of tasks as a whole can be carried out efficiently by the plurality of robots R.

In the embodiment illustrated in FIG. 1, the robot control system A includes a plurality of robots R, a base station 1 capable of establishing wireless communication with the robots R, a robot control apparatus 3 communicatively coupled with the base station through a router 2, and a terminal 5 communicatively coupled with the robot control apparatus 3 through a network 4.

The robots R are configured to carry out their own tasks in accordance with executive instructions transmitted from the robot control apparatus 3. In one embodiment, at least one robot R is placed in a task execution area defined in advance as an area in which the robots R carry out their tasks.

In FIG. 1, illustrated by way of example are: a robot RA carrying out a receptionist's task, i.e., conducting a visitor to a predetermined place such as a reception room and an assembly room; a robot RB carrying out a porter's task, i.e., carrying and delivering burdens or baggage to somebody; and a robot RC carrying out a standby task of waiting for a new task to be assigned.

The base station 1 is configured to enable a data exchange between the robots R and the robot control apparatus 3. To be more specific, the base station 1 in operation receives, and transmits to a robot R, an executive instruction output from the robot control apparatus 3, and receives, and transmits to the robot control apparatus 3, data indicative of status of a robot R transmitted from the robot R (status information) or a signal indicative of receipt of the executive instruction by the robot R (acknowledgment signal). In one embodiment, at least one base station 1 is provided in the task execution area, and the number of the base stations 1 to be provided may be determined so that the data exchange between the robots R and the robot control apparatus 3 can be established without fail. In an exemplary embodiment where the task execution area is defined to extend over two or more floors of a building, the base station 1 may preferably be provided in each floor; in another embodiment where the task execution area is too broad to be covered by a single base station 1, two or more base stations 1 may preferably be installed in geographically dispersed locations on the task execution area E.

The robot control apparatus 3 has a task executive plan (task schedule) organized for each robot R to carry out a task (or a series of tasks), and is configured to rearrange the tasks registered in the task schedule (i.e., reevaluating the execution order of the tasks, and changing the tasks) based on the remaining amount of charge in the battery of the robot R.

The terminal 5 allows an operator to carry out operations, for example, as follows: (1) to register tasks to be carried out by the robots R; (2) to change or update the task schedules which have been organized and stored in the robot control apparatus 3; (3) and to input instructions for actions of each robot R.

Discussions given in detail below will focus on configurations of the robot R and the robot control apparatus 3.
Robot The robot R in the illustrated embodiment is an autonomous mobile biped walking robot. The robot R is configured to carry out a task or tasks mainly in accordance with an executive instruction transmitted from the robot control apparatus 3. As shown in FIG. 1, the robot R has a head R1, two arms R2 and two legs R3. The head R1, arms R2 and legs R3 are actuated independently by corresponding actuators; and a bipedal locomotion of the robot R is regulated under control of an autonomous motion regulation unit 50 (see FIG. 2). Details of such a biped walking mechanism are furnished for example in JP 2001-62760 A, the disclosure of which is herein incorporated by reference in its entirety.

Figure 2:
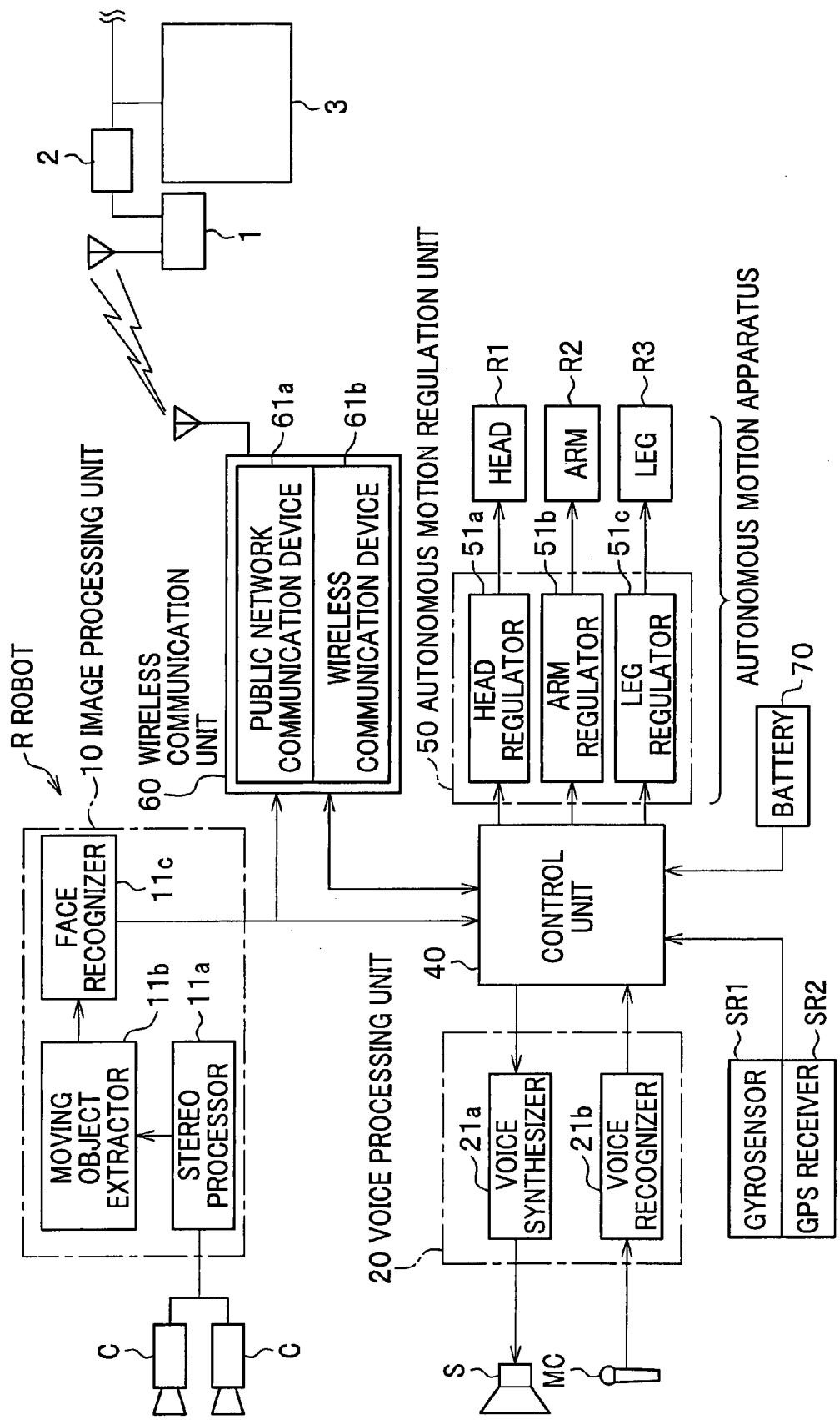
FIG. 2 is a block diagram of a robot R.

FIG. 2 is a block diagram of a robot R.

As shown in FIG. 2, in addition to the head R1, arms R2 and legs R3 mentioned above, the robot R includes, two cameras C, one speaker S, one microphone MC, an image processing unit 10, a voice processing unit 20, a control unit 40, an autonomous motion regulation unit 50, a wireless communication unit 60, and a battery 70. The robot R further includes a gyrosensor SR1 and a GPS receiver SR2 to acquire an instantaneous position of the robot R.

Camera

The camera C is an image sensor capable of capturing a scene and converting an optical image into digital data; for example, a color CCD camera or a multi-color pickup unit using charge-coupled devices (charge-coupled image sensor) may be used therefor. Two cameras C are arranged in the present embodiment right and left on substantially the same level, and the images captured by these cameras C are transmitted as digital signals respectively to the image processing unit 10 to enable stereoscopic vision. The cameras C, as well as the speaker S and the microphone MC, are installed in the head R1 of the robot R.

Image Processing Unit

The image processing unit 10 is configured to receive images transmitted from the cameras C and to recognize any obstacles and/or persons around the robot R by processing the images so as to grasp the surrounding circumstances of the robot R from the images captured by the cameras C. The image processing unit 10 includes a stereo processor 11*a*, a moving object extractor 11*b* and a face recognizer 11*c*.

The stereo processor 11*a* is configured to perform pattern matching of the two images captured by the right and left cameras C, thereby calculating parallax between corresponding pixels in the right and left images so as to generate a parallax image, and to output the parallax image generated together with the original captured images to the moving object extractor 11*b*. It is understood that the parallax calculated as above in the stereo processor 11*a* represents a distance from the robot R to an object captured by the cameras C.

The moving object extractor 11*b* is configured to extract a moving object in the captured images based on data output from the stereo processor 11*a*. Extraction of the moving object is performed for the purpose of recognizing a person on the presumption that the moving object is the person.

In order to extract a moving object, the moving object extractor 11*b* is configured to retain past few frames of the image, so as to compare the latest frame (last captured image of a scene) with the past frames (previously captured images of the same scene) for pattern matching, thereby calculating a motion amount of each pixel to generate a motion amount image. The moving object extractor 11*b* determines, from the parallax image and the motion amount image, whether a moving object is in the captured images; i.e., if pixels of a large motion amount are observed within a specific limited range of distances, the moving object extractor 11*b* assumes that there exists a moving object (e.g., person) in an area composed of those pixels, and extracts the moving object as a parallax image with the specific limited range of distances, to output the parallax image for the extracted moving object to the face recognizer 11*c*.

The face recognizer 11*c* is configured to extract a skin-color portion from the extracted moving object, so as to recognize an area of a face from a size, shape and so forth of the skin-color portion. Similarly, areas corresponding to hands are recognized from a size, shape, etc. of other skin-color portions. Information indicative of the area recognized as the face is output to the control unit 40 for use in determining the motion of the robot R and in an attempt to communicate with that person, and is output to the wireless communication unit 60 so that the information is transmitted via the base station 1 to the robot control apparatus 3.

Voice Processing Unit

The voice processing unit 20 includes a voice synthesizer 21*a* and a voice recognizer 21*b*. The voice synthesizer 21*a* is configured to generate voice data from text data based on instructions on a speech action determined by and transmitted from the control unit 40, and to cause the speaker S to output a voice corresponding to the instructed speech action. To generate the voice data, the voice processing unit 20 utilizes pre-stored information on the correspondence of the voice data and the text data associated with each other.

The voice recognizer 21*b* is configured to receive an audio signal from the microphone MC to detect and recognize voice data therefrom, to generate text data from the recognized voice data utilizing pre-stored information on the correspondence of the text data and the voice data associated with each other, and to transmit the text data to the control unit 40.

Control Unit

The control unit 40 is configured to generate a signal to be transmitted to the robot control apparatus 3 that will be described later, and to control the components of the robot R which include image processing unit 10, voice processing unit 20, autonomous motion regulation unit 50 and wireless communication unit 60, based on executive instructions output from the robot control apparatus 3.

More specifically, upon receipt of an executive instruction output from the robot control apparatus 3, the control unit 40 generates a signal indicative of the receipt of the executive instruction (acknowledgment signal), and transmits the acknowledgment signal through the wireless communication unit 60 to the robot control apparatus 3.

The control unit 40 then generates control signals for controlling the components (image processing unit 10, voice processing unit 20, autonomous motion regulation unit 50 and wireless communication unit 60), and transmits the generated control signals to the respective components of the robot R on an as-needed basis.

The control unit 40 further generates data indicative of status of the robot R (status information) at predetermined time intervals, and transmits the generated status information through the wireless communication unit 60 to the robot control apparatus 3.

Hereupon, the status information is information used by the robot control apparatus 3 that will be described later to determine whether any of the robots R requires battery charge.

In the present embodiment, the status information includes: (i) various pieces of data (hereinafter referred to as "battery information" in general) including remaining battery charge data indicative of the remaining amount of charge in the battery 70 installed in the robot R, and data indicative of battery temperature, battery voltage value and battery current value, etc.; (ii) coordinate data indicative of the current position of the robot R (position information); (iii) data composed of a task ID indicative of contents of a task that the robot R is currently executing and a progress indicative of the stages of development of the task corresponding to the task ID (task information); and (iv) data indicative of an own identification number assigned to each robot R (robot ID).

In the present embodiment, the control unit 40 is configured (1) to generate and output the status information at predetermined time intervals, but may alternatively be configured (2) to generate and output the status information when the battery level lowers below a predetermined threshold, or (3) to generate and output the status information upon receipt of a signal requesting transmission of status information (data request signal) from the robot control apparatus 3. The status information may be generated and output in varying combinations of the above operation modes (1)-(3) where appropriate.

Autonomous Motion Regulation Unit

The autonomous motion regulation unit 50 includes a head regulator 51a, an arm regulator 51b and a leg regulator 51c. The head regulator 51a causes the head R1 to be actuated in accordance with instructions of control signals transmitted from the control unit 40; the arm regulator 51b causes the arms R2 to be actuated in accordance with instructions of control signals transmitted from the control unit 40; and the leg regulator 51c causes the legs R3 to be actuated in accordance with instructions of control signals transmitted from the control unit 40.

Wireless Communication Unit

The wireless communication unit 60 is a communication device for transmitting and receiving data to and from the robot control apparatus 3. The wireless communication unit 60 includes a public network communication device 61a and a wireless communication device 61b.

The public network communication device 61a is means for wireless communication using public networks such as the cellular phone network and the PHS (personal handyphone system) microcellular phone network. On the other hand, the wireless communication device 61b is means for wireless communication using a short-distance wireless network such as a wireless local area network (LAN) in conformity with IEEE 802.11b standard.

The wireless communication unit 60 selects either of the public network communication device 61a or the wireless communication device 61b in response to a connection request from the robot control apparatus 3, so as to establish data communication with the robot control apparatus 3.

The battery 70 is a source of power supply required for operation or processing of the components in the robot R.

The gyrosensor SR1 and the GPS receiver SR2 are configured to generate coordinate data indicative of the current position of the robot R, so as to transmit the generated coordinate data to the control unit 40. The coordinate data is utilized to determine the actions of the robot R as well as to generate the status information as described above.

Robot Control Apparatus

The robot control apparatus 3 of FIG. 1 organizes and stores therein a task executive plan (task schedule) for each robot R which task executive plan is provided to be executed by the robot R, and to rearrange the task schedule (i.e., changing assignment of the tasks and changing the tasks) based on the remaining amount of charge in the battery of the robot R.

Figure 3:
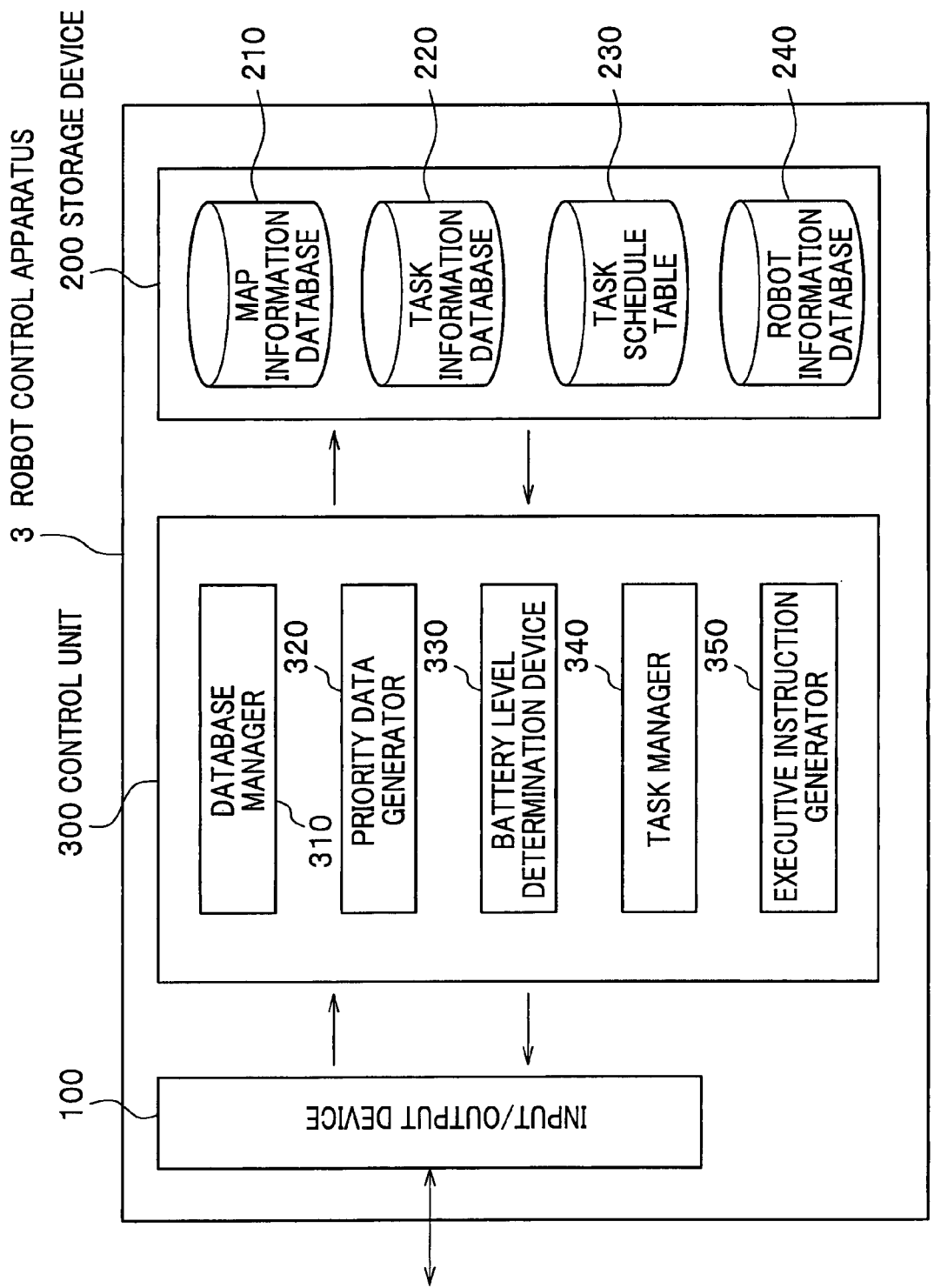
FIG. 3 is a block diagram of a robot control apparatus 3.

As shown in FIG. 3, the robot control apparatus 3 includes an input/output device 100, a storage device 200 and a control unit 300.

Input/Output Device

The input/output device 100 is an interface by which the robot control apparatus 3 exchanges data between the robots R and the terminal 5 via the base station 1 and the network 4.

Through the input/output device 100, in this embodiment, the robot control apparatus 3 exchanges the following data: status information and an acknowledgment signal that are received from the robots R; a signal requesting entry or update of a task that is received from the terminal 5 (task request signal); an executive instruction that is generated in an executive instruction generator 350 (for details, see below).

Of these pieces of input status information, task request signal and acknowledgement signal, the input/output device 100 outputs the status information, the task request signal and the acknowledgement signal to a database manager 310, and outputs only the status information to a battery level determination device 330.

Storage Device

The storage device 200 is configured to retain data required for control over the robots R. The storage device 200 contains, but not limited to, a map information database 210, a task information database 220, a task schedule table 230, and a robot information database 240.

<Map Information Database>

The map information database 210 is a database containing map information (global map) of a task execution area E (area within which the robots R are supposed to execute tasks).

In the map information database 210, objects that exist in the task execution area, such as passages (passageways), stairs (stairways), elevators, rooms and battery charge areas, are registered in association with coordinate data indicative of positions in the task execution area.

Accordingly, in the present embodiment, by consulting or referring to the map information database 210 from the viewpoint of an instantaneous position of a robot R at the present moment, the positional relationship between the robot R located in the task execution area and a specific object (target) in the task execution area can be retrieved.

The positional relationship which the map information database 210 can provide includes: for example, a distance from the robot R to a battery charge area, and a direction in which the battery charge area is positioned with respect to the front direction of the robot R.

The robot control apparatus 3 is configured to generate signals instructing autonomous motion and execution of tasks of robots R (task executive instruction), based on the positional relationship; thus, the robots R can be allowed to move to a desired position (e.g., task start position) in the task execution area via the shortest optimum route, so that the robots R can autonomously move and carry out their tasks in an optimized and timely manner. Further, the robot control apparatus 3 is configured to calculate battery consumption amount and battery consumption time required for traveling of the robot R based on the positional relationship and the average traveling speed of the robot R.

In this exemplary embodiment, in order to update the map information stored in the map information database 210, a database manager 310 of the control unit 300 that will be described later operates and allows an operator to manipulate the terminal 5 to input data therethrough.

<Task Information Database>

The task information database 220 is a database containing information regarding tasks which the robots R are supposed to carry out (task data).

As shown in FIG. 4, the task information database 220 provides the following information items: (i) a unique identifier ("task ID") assigned to each task; (ii) priority of the task; (iii) importance of the task; (iv) a robot ID indicative of an identifier of a robot supposed to carry out the task; (v) task content indicative of the content of the task (e.g., receptionist's task, porter's task, etc.); (vi) start position indicative of a position within the task execution area in which a robot is supposed to start the task; (vii) end position indicative of a position within the task execution area in which a robot is supposed to finish the task; (viii) necessary time indicative of time required to carry out the task; (ix) expected task start time (start time; (v); expected task finish time (end time); and (vi) status of the task.

In this exemplary embodiment, the new entry or registration of the task in the task information database 220 as well as the update of the content of the registered task in the information items are performed by the database manager 310 through the data input from the terminal 5 manipulated by the operator.

An example is given of the case in which a user registers a porter's task in the task information database 220. When a user inputs the content of the task, the start position, the end position and the start time from the terminal 5, a new task having content of the information item as shown in FIG. 4 in the column of the task ID number 10 is registered in the task information database 220.

<Task Schedule Database>

As shown in FIG. 5, the task schedule table 230 is a table containing information regarding a schedule of tasks, and provides various information items for each task which include "execution order" of the task to be executed by robot R, "task ID" for use in identifying a specific task among those registered in the task information database 220, "priority" of the task, "task content" of the task, and "status" of the task.

In the task schedule database 230, the information itemized in fields as described above is organized for each robot R located in the task execution area, so that the tasks assigned to each robot R and the order of the tasks to be carried out by the robot R are retrievable.

With reference to an example as shown in FIG. 5, the task specified by the task ID number 3 is assigned to the robot R which is specified by the ID number 1. The priority of this task is "3", and the content of the task is "porter". Further, it can be confirmed that the robot R specified by the robot ID number 1 is currently executing the task.

The task specified by the task ID number 7 is reserved after the task specified by the task ID number 3.

In the present embodiment, each information item displayed on the task schedule table 230 is linked as the task ID with an identifier for reference to the associated information item in the task information database 220.

In other words, the task schedule table 230 is a database for assigning unexecuted tasks in a waiting queue among the tasks registered in the task information database 220 to the robots R, and for determining the order of tasks to be executed by each robot R.

Assignment and execution order of the tasks displayed on the task schedule table 230 are determined and changed by the task manager 340 to be described later.

<Robot Information Database>

The robot information database 240 is a database containing data indicative of statuses of the robots R (status information).

In the robot information database 240 is provided various information items (fields of itemized information) including "battery information", "position information" and "task information", plus information or data regarding the presence or absence of anomaly in driving systems of the robots R, and other information, and these information items are associated with the "robot ID".

The content of each item of information stored in the robot information database 240 is updated by the database manager 310 of the control unit 300 that will be described later, based on the status information transmitted from the robots R.

Control Unit

Figure 6:
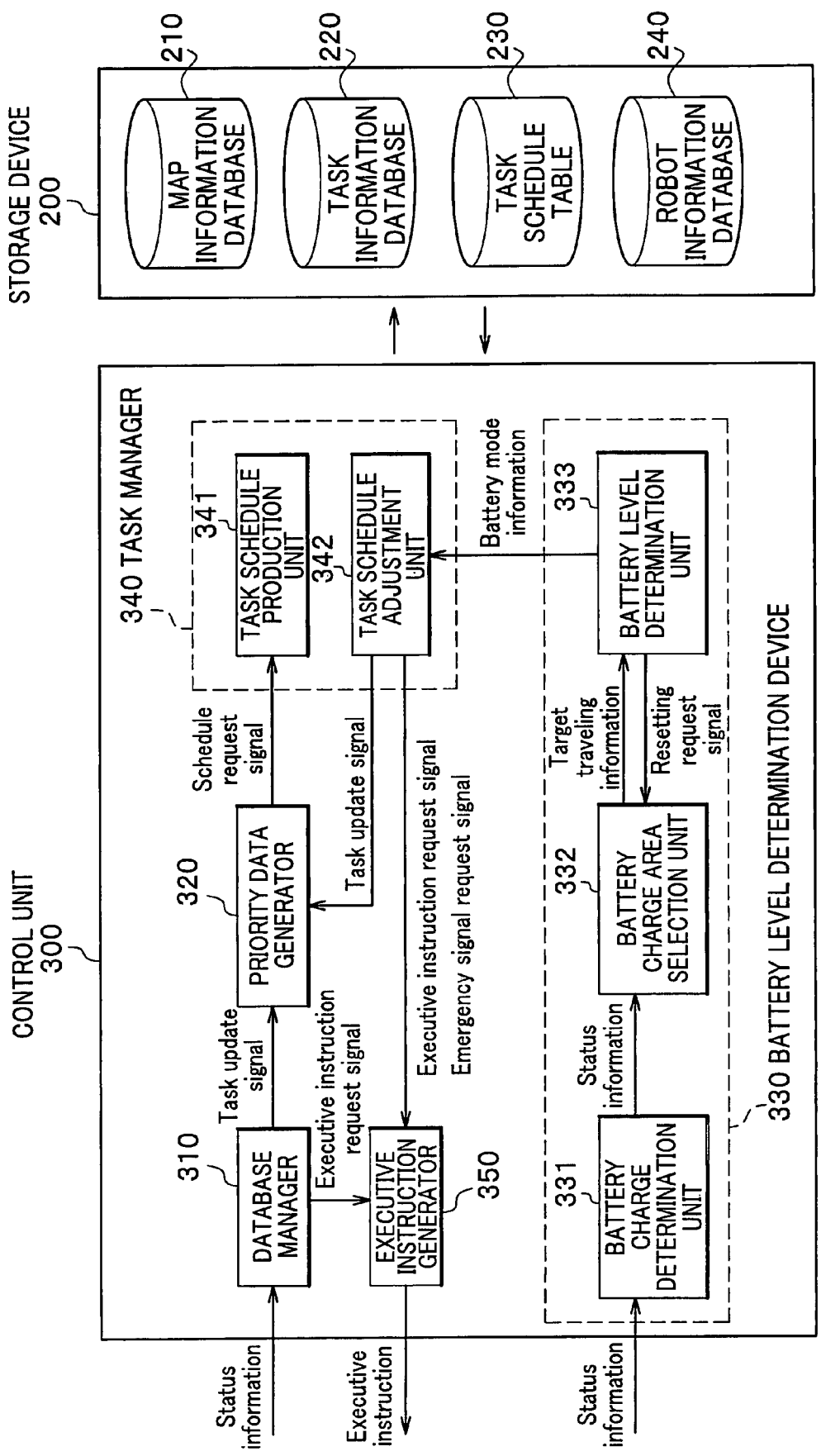
FIG. 6 is a block diagram of a control unit 300 and a storage device 200 of the robot control apparatus 3.

The control unit 300 includes, as shown in FIGS. 3 and 6, a database manager 310, a priority data generator 320, a battery level determination device 330, a task manager 340 and an executive instruction generator 350.

<Database Manager>

The database manager 310 is configured to manage entry or registration of data into the databases 210, 220, 230 and 240 stored in the storage device 200, and to manage update of data registered in the databases 210, 220, 230 and 240.

For example, when the database manager 310 receives status information indicative of the status of a robot R through the input/output device 100, the database manager 310 consults or refers to the robot information database 240 based on a robot ID included in the status information, and updates the contents (data) of information items in the robot information database 240 identified by the robot ID with the contents (data) of information items acquired from the status information of the robots R.

If the task information included in the received status information indicates that the robot R has "finished" execution of a task, the database manager 310 proceeds to generate an executive instruction request signal requesting the executive instruction generator 350 to generate an executive instruction for instructing the robot R to execute a task. Then, the database manager 310 transmits the generated executive instruction request signal to the executive instruction generator 350. Upon receipt of the executive instruction request signal transmitted from the database manager 310, the executive instruction generator 350 generates the executive instruction so as to cause the robot R to carry out the next task which has been assigned to the robot R.

When the database manager 310 receives from the input/output device 100 a task request signal requesting registration of a new task or update of an existing task which have been entered at the terminal 5, the database manager 310 updates the task information database 220 (updating the contents of information items stored therein), generates a task update signal indicating that the task information database 220 has been updated, and transmits the generated task update signal to the priority data generator 320.

<Priority Data Generator>

The priority data generator 320 is configured to determine priority of tasks to be executed by the robots R.

To be more specific, when the priority data generator 320 receives a task update signal from the database manager 310 or when the priority data generator 320 receives from the task manager 340 a task update signal indicating that the task information database 220 has been updated by the registration of a battery charging task into the task information database 220, the priority data generator 320 determines the priorities of unexecuted (to be executed) tasks among those registered in the task information database 220.

The priority data generator 320 then generates a schedule request signal requesting the task manager 340 to organize schedules for the unexecuted tasks among those registered in the task information database 220, and transmits the generated schedule request signal to the task manager 340.

In the present embodiment, determination of priority of each task is made with consideration given to: the importance of the task set at the time of registration of the task into the task information database 220; the distance between the start position of the task and the robot located closest to the task start position; and the time remaining until the start time or end time of the task from the present time.

Specifically, the priority data generator 320 determines the priority of each task by calculating the priority P of the task using Equation (1) below:

$$P = (T_{pri} + n(T_{sp})) \cdot f(T_{err}) \qquad (1)$$

where $T_{pri}$ is the importance of the task determined as desired at the time of registration of the task into the task information database 220, $T_{sp}$ is the time required for the robot located closest to the start position of the task to move to the start position, $n(T_{sp})$ is the distance-dependent importance determined so that when a robot R exists near the start position of the task, the robot R is caused to carry out the task preferentially, and $f(T_{err})$ is the time-dependent importance determined so that a task to be carried out preferentially is determined based on the time remaining until the start time or end time of the task from the present time.

In this exemplary embodiment, the importance $T_{pri}$ of the task is set in increments of 0.5 between 1.0 and 5.0 inclusive. The task of the least importance $T_{pri}$ is designated by 1.0, while the task of the greatest importance $T_{pri}$ is designated by 5.0. The distance-dependent importance $n(T_{sp})$ is determined to be greater, as the robot R is located closer to the start position of the task, and $n(T_{sp})$ represents a predetermined positive value only if $T_{sp}$ is equal to or smaller than a predetermined threshold, while $n(T_{sp})$ represents '0' (zero) if $T_{sp}$ is greater than the predetermined threshold. The time-dependent importance $f(T_{err})$ is set in the range from 0 to 1, where $f(T_{err})$ rapidly increases from '0' to '1' as the start time of the task approaches, and represents the maximum value '1' from a reference time (the time preceding the start time of the task by a period of time required for a robot R to execute the task) to the end time of the task, and gradually decreases to '0' after the end time of the task.

More specifically, in this exemplary embodiment, the time-dependent importance $f(T_{err})$ is calculated using Equation (2) during the period when the present time is at a time before the reference time, using Equation (3) during the period when the present time is at a time after the reference time and before the end time of the task, and using Equation (4) during the period when the present time is at a time after the end time of the task:

$$f(T_{err}) = \exp(-K((T_{err} - T_{time})/T_{time})) \quad (2)$$

$$f(T_{err}) = 1 \quad (3)$$

$$f(T_{err}) = (1 + \cos((\pi/T_{time})(T_{err}/C_{obli})))/2 \quad (4)$$

where $T_{err}$ is the time interval between the present time and the start time of the task, which time interval represents a positive value before the start time of the task, and represents a negative value after the start time of the task, $T_{time}$ is the period of time required to execute the task (necessary time for the task), and $C_{obli}$ is an oblivion coefficient such that $$\text{if } T_{err} = -C_{obli} \cdot T_{time}, \text{ then } f(T_{err}) = 0.$$

Since the priority P of each task is determined, as described above, with consideration given to: the importance of the task set at the time of registration of the task into the task information database 220; the distance between the start position of the task and the robot R located closest to the task start position; and the time remaining until the start time or end time of the task from the present time, an optimum value can be obtained as the priority P of the task.

<Battery Level Determination Device>

As shown in FIG. 6, the battery level determination device 330 determines a battery level of a battery 70 installed in each robot R from a predetermined plurality of battery levels based on the amount of remaining charge in the battery 70 of the robot R.

The battery level determination device 330 includes a battery charge determination unit 331, a battery charge area selection unit 332 and a battery level determination unit 333.

The battery charge determination unit 331 determines whether or not the battery 70 of each robot R requires charge (replacement and/or recharge). The battery charge determination unit 331 excludes a case where the charge of the battery 70 is obviously unnecessary.

To be more specific, when the battery charge determination unit 331 receives the status information from the input/output device 100, the battery charge determination unit 331 confirms or checks if the robot R is executing the battery charging task based on the task information contained in the status information, and determines whether or not the battery replacement task should be added to or inserted into the task schedule of the robot R.

If the robot R is executing the battery charging task, it corresponds to the case in which the battery charge is not necessary. The battery charge determination unit 331 then finishes the process.

If the robot R is not executing the battery charging task, the battery charge determination unit 331 then acquires the data indicative of the amount of remaining charge in the battery 70 (remaining battery charge data) from the battery information contained in the status information, and compares the acquired remaining battery charge data with a predetermined first threshold.

The battery charge determination unit 331 transmits the status information input from the input/output device 100 to the battery charge area selection unit 332 if the value indicated by the remaining battery charge data is lower than the first threshold.

If the value indicated by the remaining battery charge data is equal to or more than the first threshold, the battery charge determination unit 331 finishes the process.

The first threshold is provided for reducing the data processing load in the battery level determination device 330 (robot control apparatus 3) by excluding the case where the charge of the battery is obviously unnecessary.

In the present embodiment, the first threshold is set in advance with consideration given to factors which affect the battery consumption, such as status of the task execution area in which the robots R are located, for instance, there are many up and down slopes, the robots are supposed to execute tasks in the environment with high temperature and humidity, etc.

The battery charge area selection unit 332 determines a battery charge area, i.e., a place in which a robot R travels for battery charge, with regard to the robot R specified by the robot ID contained in the status information.

The battery charge area selection unit 332 receives the status information for each robot R from the battery charge determination unit 331, refers to the task information contained in the status information, and confirms or checks if the robot R is executing any of the tasks other than the battery charging task.

If the robot R is not under execution of the task, the battery charge area selection unit 332 acquires the coordinate data (current position data) indicative of the current position of the robot R from the position information contained in the status information.

The battery charge area selection unit 332 then refers to the map information database 210 based on the current position data, selects, among a plurality of battery charge areas (B1 to B3 of FIG. 1) to be set in advance within the task execution area, one battery charge area which is the closest battery charge area from the position specified by the current position data and which has not been occupied by the battery charge reservation, and then sets the selected battery charge area as a target traveling area of the robot R.

Meanwhile, if the robot R is under execution of the task, the battery charge area selection unit 332 acquires the task ID indicating the task the robot R is currently executing from the task information contained in the status information. The battery charge area selection unit 332 then refers to the task information database 220 on the basis of the acquired task ID, and acquires the coordinate data indicative of the position (end position of the task) at which the robot R finishes the currently executing task (i.e., task end position data).

The battery charge area selection unit 332 refers to the map information database 210 based on the task end position data, selects, among a plurality of battery charge areas (B1 to B3) to be set in advance within the task execution area, one battery charge area which is the closest battery charge area from the position specified by the task end position data and which has not been occupied by the battery charge reservation, and then sets the selected battery charge area as the target traveling area of the robot R.

Hereupon, the battery charge area which has not been occupied by the battery charge reservation indicates a battery charge area which has not been reserved by other robots R as the place in which the robot R travels for battery charge (i.e., target traveling area). Whether or not the battery charge reservation is occupied can be confirmed by referring to the task information database 220.

The battery charge area selection unit 332 generates target traveling information consisting of the coordinate data of the target traveling area and data indicating various information items of the status information, and outputs the generated target traveling information to the battery level determination unit 333.

The coordinate data is used for calculation of thresholds (second to fourth thresholds) at the battery level determination unit 333 that is positioned downstream of the battery charge area selection unit 332.

Accordingly, in the present embodiment, the target traveling area is set in accordance with whether or not the robot R is executing a task. Namely, the target traveling area is set based on the current position of the robot R if the robot R is not executing the task, and based on the task end position if the robot R is executing the task.

For this reason, in a case in which the target traveling area is set based on the task end position and the battery level determined by the subsequent battery level determination unit 333 is a level indicating that the robot R cannot complete the currently executing task, the battery level determination unit 333 may input a signal requesting resetting or replacing the target traveling area based on the current position of the robot R (i.e., resetting request signal) to the battery charge area selection unit 332.

In this instance, the battery charge area selection unit 332 resets or replaces the target traveling area based on the current position of the robot R. The battery charge area selection unit 332 acquires the coordinate data of the reset target traveling area (substituted target traveling area) from the map information database 210, and output the acquired coordinate data to the battery level determination unit 333.

Battery Level Determination Unit

The battery level determination unit 333 determines a battery level of the battery 70 of each robot R, namely to which level the status of the battery belongs among a predetermined plurality of battery levels (mode 1 to mode 4).

To be more specific, when the battery level determination unit 333 receives the target traveling information from the battery charge area selection unit 332, the battery level determination unit 333 refers to the task information contained in the target traveling information and confirms or checks if the robot R is executing a task other than the battery charging task.

If the robot R is executing a task, the battery level determination unit 333 compares the remaining battery charge data indicative of the remaining amount of charge in the battery obtained from the target traveling information with a threshold that is calculated in consideration of: (i) the amount of battery expense required for the robot R to complete the currently executing task; and (ii) the amount of battery expense required for the robot R to move from the task end position where the robot R finishes the currently executing task to the target traveling area. The battery level determination unit 333 then determines which one of the battery level (mode 1 to mode 4) the status of the battery 70 of the robot R belongs to.

Meanwhile, if the robot R is not executing a task, the battery level determination unit 333 compares the remaining battery charge data indicative of the remaining amount of charge in the battery with a threshold that is calculated in consideration of: (i) the amount of battery expense required for the robot R to move from the current position to the target traveling area. The battery level determination unit 333 then determines which one of the battery level (mode 1 to mode 4) the status of the battery 70 of the robot R belongs to.

In other words, in accordance with the status of whether the robot R is executing a task, the battery level determination unit 333 compares the remaining battery charge data indicative of the remaining amount of charge in the battery with the threshold that is calculated at least in consideration of one of the followings: (i) the amount of battery expense required for the robot R to complete the currently executing task; and (ii) the amount of battery expense required for the robot R to move to the target traveling area. The battery level determination unit 333 then determines the battery level of the battery 70 from the modes 1 to 4.

In the present embodiment, three thresholds are used in the battery level determination unit 333.

In the battery level determination unit 333, the remaining battery charge data is firstly compared with a second threshold Ref2. If the remaining amount of charge in the battery is equal to or higher than the second threshold Ref2, the battery level determination unit 333 determines that the status of the battery 70 of the robot R is in mode 1.

If the remaining amount of charge in the battery is lower than the second threshold Ref2, the battery level determination unit 333 then compares the remaining amount of charge with a third threshold Ref3. If the remaining amount of charge in the battery is equal to or higher than the third threshold Ref3, the battery level determination unit 333 determines that the status of the battery 70 of the robot R is in mode 2.

Further, if the remaining amount of charge in the battery 70 is lower than the third threshold Ref3, the battery level determination unit 333 then compares the remaining amount of charge with a fourth threshold Ref4. If the remaining amount of charge in the battery is equal to or higher than the fourth threshold Ref4, the battery level determination unit 333 determines that the status of the battery 70 of the robot R is in mode 3. If the remaining amount of charge in the battery is lower than the fourth threshold Ref4, the battery level determination unit 333 determines that the status of the battery 70 is in mode 4.

In the present embodiment, the aforementioned second threshold Ref2 and third threshold Ref3 are calculated using the following Equations (5) and (6):

$$Ref2 = B_L + C_b + \alpha \tag{5}$$

$$Ref3 = B_L + C_b + \beta \tag{6}$$

where $B_L$ is the critical amount of battery required for the least robot activity (least amount of battery at least required for autonomous movement of the robot), $C_b$ is the amount of battery expense required for the robot R to move to the target traveling area from either the task end position where the robot R finishes the currently executing task or the current position of the robot R, and α and β are values calculated by adding the amount of battery expense required for the robot R to complete the currently executing task and battery margin.

Herein, $C_b$, α and β are defined by the following Equations (7), (8) and (9):

$$C_b = Wr + G(\text{battery task}) \quad (7)$$

$$\alpha = C\text{task} + 2bm \quad (8)$$

$$\beta = C\text{task} + bm \quad (9)$$

where Wr is the amount of battery expense required only for the robot R to move to the target traveling area from the task end position where the robot R completes the currently executing task or from the current position of the robot R, G(battery task) is the amount of battery expense required for the robot R to perform an action other than traveling, such as making a gesture or speech, during the travel of the robot R to the target traveling area from the task end position where the robot R completes the currently executing task or from the current position of the robot R, Ctask is the amount of battery expense required only for the robot R to execute the task until the robot R completes the currently executing task, and bm is battery margin.

In the present embodiment, since the battery charge area (target traveling area) that is set by the battery charge area selection unit 332 is different in accordance with whether or not the robot R is currently executing a task, the second threshold Ref2 and the third threshold Ref3 used in the battery level determination unit 333 also become different in accordance with whether or not the robot R is currently executing a task.

Namely, if the robot R is executing a task, since the target traveling area is set based on the task end position where the robot R completes the currently executing task, Wr given by Equation (7) represents the amount of battery expense used for the travel of the robot R from the task end position to the target traveling area.

Therefore, the second threshold Ref2 corresponds to a value that is set for confirming whether the remaining amount of charge in the battery of the robot R is sufficient for the robot R to move to the target traveling area after the robot R completes the currently assigned task. The third threshold Ref3 corresponds to a value that is set for confirming whether the remaining amount of charge in the battery of the robot R is barely sufficient for the robot R to move to the target traveling area after the robot R completes the currently assigned task.

If the robot R is not executing a task, since the target traveling area is set based on the current position of the robot R, Wr given by Equation (7) represents the amount of battery expanse used for the travel of the robot R from the current position of the robot R to the target traveling area.

Therefore, the second threshold Ref2 corresponds to a value that is set for confirming whether the remaining amount of charge in the battery of the robot R is sufficient for the robot R to move from the current position to the target traveling area. The third threshold Ref3 corresponds to a value that is set for confirming whether the remaining amount of charge in the battery in the battery of the robot R is barely sufficient for the robot R to move from the current position to the target traveling area.

In this instance, if the robot R is not executing a task, the amount of battery expense used for the execution of the task is zero, i.e., Ctask=0. Therefore, the following Equations (10) and (11) are given by substituting the above Equations (7), (8) and (9) for Equations (5) and (6):

$$\begin{aligned}Ref2 &= BL + Wr + G(\text{battery task}) + C\text{task} + 2bm \\ &= BL + Wr + G(\text{battery task}) + 2bm\end{aligned} \quad (10)$$

$$\begin{aligned}Ref3 &= BL + Wr + G(\text{battery task}) + C\text{task} + bm \\ &= BL + Wr + G(\text{battery task}) + bm\end{aligned} \quad (11)$$

Further, in the present embodiment, the fourth threshold Ref4 is a value that is calculated by the following Equation (12). The fourth threshold Ref4 is a value that is set for confirming whether the remaining amount of charge in the battery of the robot R is barely sufficient for the robot R to move from the current position of the robot R to the target traveling area.

$$Ref4 = BL + Cb + bm \quad (12)$$

where BL is the critical amount of battery required for the least robot activity (least amount of battery at least required for autonomous movement of the robot), Cb is the amount of battery expense required for the robot R to move from the current position to the target traveling area, and bm is battery margin.

Herein Cb is defined by the following Equation (13).

$$Cb = Wr + G(\text{battery task}) \quad (13)$$

where Wr is the amount of battery expense required only for the robot R to move from the current position to the target traveling area, G(battery task) is the amount of battery expense required for the robot R to perform an action other than traveling, such as making a gesture or speech, during the travel of the robot R from the current position to the target traveling area.

In the present embodiment, the battery charge area (target traveling area) that is set by the battery charge area selection unit 332 is different in accordance with whether or not the robot R is executing a task. If the robot R is executing a task, the target traveling area is set based on the task end position.

For this reason, the amount of battery expense used for traveling of the robot R to the target traveling area that is reset (newly set) based on the current position of the robot R may become smaller than the amount of battery expense used for traveling to the target traveling area that is set based on the task end position of the robot R.

Therefore, if the remaining amount of charge in the battery is smaller than the third threshold Ref4 and the robot R is executing a task, the battery level determination unit 333 inputs a signal requesting resetting or replacing the target traveling area based on the current position of the robot R (i.e., resetting request signal) to the battery charge area selection unit 332.

When the coordinate data of the reset target traveling area (substituted target traveling area) that is reset or replaced by the battery charge area selection unit 332 in accordance with the resetting request signal and based on the current position of the robot R is transmitted from the battery charge area selection unit 332, the battery level determination unit 333 calculates the amount of battery expense required for the robot R to move to the substituted target traveling area with reference to the map information database 210. The battery level determination unit 333 then calculates Ref4 by Equation

(12) above using the thus calculated amount of battery expense, and sets the obtained Ref4 as a comparison value.

The battery level determination unit 333 compares the comparison value with Ref4 (reference value) that is calculated by Equation (12) above using the amount of battery expense required for traveling of the robot R to the target traveling area that is set based on the task end position of the robot R. If the comparison value is smaller than the reference value, the battery level determination unit 333 newly sets the comparison value as the fourth threshold Ref4.

Meanwhile, if the comparison value is greater than the reference value, the battery level determination unit 333 maintains the reference value as the fourth threshold Ref4.

The battery level determination unit 333 then compares the remaining amount of charge in the battery with the fourth threshold. If the remaining amount is equal to or greater than the fourth threshold Ref4, the battery level determination unit 333 determines that the status of the battery 70 of the robot R is in the mode 3. If the remaining amount is smaller than the fourth threshold Ref4, the battery level determination unit 333 determines that the status of the battery 70 of the robot R is in the mode 4.

As described above, the battery level determination unit 333 determines to which level the status of the battery 70 of the robot R belongs among the predetermined plurality of battery levels (mode 1, mode 2, mode 3 and mode 4) with the comparison between the remaining battery charge data and the thresholds.

The battery level determination unit 333 generates information (battery mode information) at least including: information indicating to which level the status of the battery 70 of the robot R belongs among the plurality of modes 1 to 4; and data indicating various information items of the target traveling information. The battery level determination unit 333 then transmits the generated battery mode information to the task manager 340.

As described previously, upon receipt of the status information, the battery level determination device 330 according to the present embodiment firstly compares the first threshold and the remaining battery charge data contained in the status information. If the remaining battery charge data is equal to or greater than the first threshold, the battery level determination device 330 does not set a target traveling area.

This is for excluding a case where the charge of the battery 70 is obviously unnecessary, so that it is possible to reduce the data processing load in the battery charge area selection unit 332 positioned downstream of the battery charge determination unit 331 as well as to reduce the comparison processing load in the battery level determination unit 333 for the comparison with the threshold values. As a result, the processing efficiency of the robot control apparatus 3 per se can be improved.

Further, in the present embodiment, if the value indicated by the remaining battery charge data is smaller than the third threshold and the robot R is executing a task, the battery charge area selection unit 332 sets the substituted target traveling area based on the current position of the robot R. If the amount of battery expense required for the robot R to move to the substituted target traveling area is smaller than the (previously set) amount of battery expense required for the robot R to move to the target traveling area, the battery level determination device 330 sets (resets) the substituted target traveling area as the target traveling area.

Accordingly, even if the remaining amount of charge in the battery of the robot R is smaller, it is possible to reset or replace the target traveling area for a traveling area where the robot R requires less battery expense to reach in accordance with the current position of the robot R. This allows the robot R to travel to a battery charge area while restricting the amount of battery expense of the robot R.

Task Manager

The task manager 340 is configured to establish task executive plans (task schedule) under which the robots R carry out their own tasks as well as to rearrange the task executive plans in accordance with the process predetermined for each battery level (mode 1 to mode 4).

The task manager 340 includes a task schedule production unit 341 and a task schedule adjustment unit 342.

<Task Schedule Production Unit>

The task schedule production unit 341 determines which robot R will be caused to carry out a task based on the priority determined for each task, and determines the order of execution of the tasks assigned to each robot R.

In other words, the task schedule production unit 341 establishes a task executive plan (task schedule) to be executed by each robot R.

To be more specific, when the task schedule production unit 341 receives a schedule request signal from the priority data generator 320, the task schedule production unit 341 acquires data (task data) regarding unexecuted (to be executed) tasks among those registered in the task information database 220. The task schedule production unit 341 then classifies the tasks based on the priority included in the task data.

By way of example, it is assumed that the tasks of the priority less than 2 are classified into group 'C', those of the priority of 2 or more and less than 4 are classified into group 'B', and those of the priority of 4 or more are classified into group 'A', and that the tasks of the task IDs 10-15 shown in FIG. 7 are unexecuted (to be executed) and have the priority values determined in the priority data generator 320 as shown in FIG. 7. In this example, the task schedule production unit 341 classifies the tasks having the task IDs '11' and '13' into group 'C', the tasks having the task IDs '10' and '15' into group 'B', and the tasks having the task IDs '2' and '14' into group 'A'.

Subsequently, the task schedule production unit 341 organizes a schedule for the tasks classified in the group consisting of the tasks of the highest priorities (i.e., group 'A' in this example) among the existing three groups 'A', 'B' and 'C'.

More specifically, the task schedule production unit 341 enumerates all possible combinations of various patterns of task assignment to each robot R located in the task execution area and various orders of execution of the tasks by the robot R (combinations defined based on which robot each task is assigned to and how the tasks assigned to the robot R are ordered). The task schedule production unit 341 then calculates the total cost for each combination assuming that the tasks are assigned to the robots R and the tasks are carried out by the robots in specific orders in accordance with the combination, so that the combination in which the total cost exhibits a minimum value is retrieved.

The schedule organization is preferably made for the robots R which have not made a reservation for the battery charging task.

The next discussion will be extended by taking for example a situation where two robots R1, R2 are put in the task execution area, and the tasks classified into the aforementioned group 'A' includes tasks of the task IDs '12' and '14', namely the total of two tasks.

In this situation, six combinations are conceivable as shown in FIG. 8 in terms of patterns of task assignment to the robots R1, R2 and orders of execution of the tasks.

In FIG. 8, the order of execution of the tasks is defined for each robot R. In combination '1', the robot R2 firstly executes the task of the task ID '12' and subsequently executes the task of the task ID '14'. Further, in combination '3', the robot R1 executes the task of the task ID '12', and the robot R2 executes the task of the task ID '14'.

Accordingly, in this situation as shown in FIG. 8, the task schedule production unit 341 calculates the total cost required for each instance where all the tasks are carried out by the robots R (R1, R2) located in the task execution area in accordance with the task schedule determined depending upon each combination (combinations '1' to '6') that is adopted.

In this exemplary embodiment, the total cost $C_{Total}$ is calculated by Equation (14) as follows:

$$C_{total} = w \cdot C_{all} + (1-W) \cdot C_{all\_complete} \quad (14)$$

where $C_{all}$ is the total amount of charge in the battery which all the robots R in the robot control system A consume by the time when the robots R finish all the tasks (operation cost), $C_{all\_complete}$ is the total period of time which elapses before all the tasks are finished, i.e., the period of time from the start time of the first task scheduled to be started first to the end time of the last task scheduled to be finished last (time cost), and w is the value of weights assigned to the operation cost and the time cost to weigh the total cost $C_{Total}$ at a desired ratio, i.e., the value set as desired in the range between 0 and 1 inclusive ($0 \leq w \leq 1$). It is appreciated that the greater the value w, the greater importance is placed on the battery consumption in the total cost ($C_{total}$), while the smaller the value w, the greater importance is placed on the time required to carry out all the tasks up to the end (necessary time).

In this manner, according to this exemplary embodiment of the present invention, the task schedule production unit 341 obtains the total costs ($C_{Total}$) respectively for all the combinations, and finds a minimum-cost combination in which the obtained total cost ($C_{total}$) exhibits the minimum value, so as to determine a task schedule by the task assignment pattern and execution order of the minimum-cost combination.

The task schedule production unit 341 repeats the same operations for the remaining groups (group 'B' and group 'C') sequentially in descending order of priority of the groups, so that the robots R are assigned to the unexecuted (to be executed) tasks in the tasks registered in the task information database 220, and the order of tasks assigned to each robot R is determined for each robot R.

<Task Schedule Adjustment Unit>

The task schedule adjustment unit 342 rearranges task executive plans (task schedule) in accordance with the process predetermined for each battery level. In other words, the task schedule adjustment unit 342 makes a reservation for the task for moving the robot R to the battery charge area (i.e., battery charging task) with respect to the task schedule of the robot R or makes the robot R execute the battery charging task if the remaining amount of charge in the battery of the robot R becomes equal to or smaller than a certain threshold.

To be more specific, the task schedule adjustment unit 342 receives battery mode information from the battery level determination unit 333 and performs the process that is indicated by the battery mode information and is predetermined for each mode.

Figure 11:
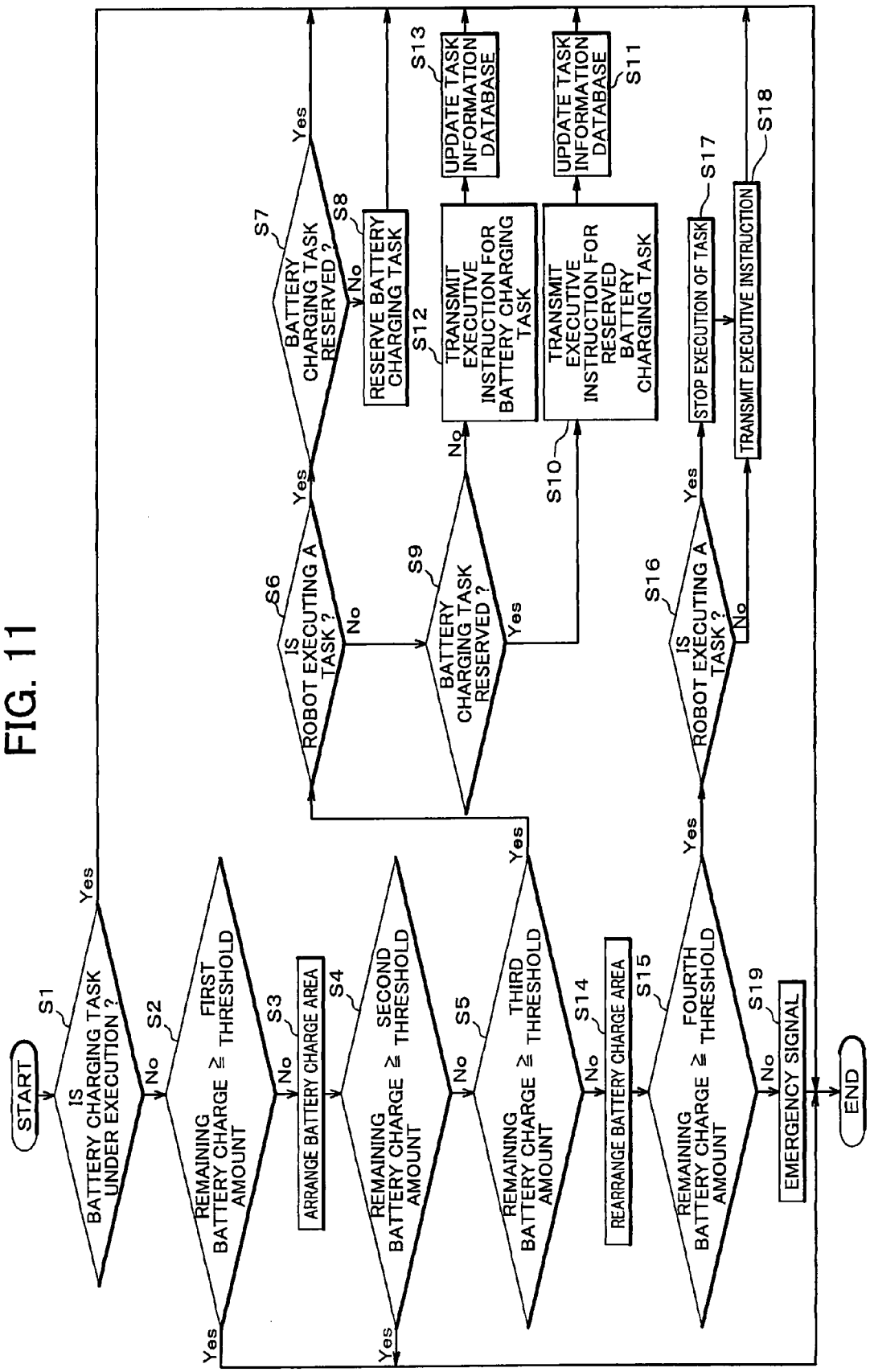
FIG. 11 is a flow chart explaining a process carried out by the robot control apparatus 3 upon determining whether or not a battery charging task is added to the task schedule of the robot R.

In order to simplify an understanding of the invention, a process to be carried out for each mode in the task schedule adjustment unit 342 will be described below with reference to the flowchart as shown in FIG. 11 where appropriate.

In the Case of Mode 1

The task schedule adjustment unit 342 does nothing if the statement of the battery indicated by the battery mode information is in mode 1 (step S4; Yes).

This is because the remaining amount of charge in the battery 70 of the robot R that is specified by the robot ID contained in the battery mode information is sufficient, and there is no need to add the battery charging task.

In the Case of Mode 2

If the statement of the battery indicated by the battery mode information is in mode 2 (step S5; Yes), the task schedule adjustment unit 342 confirms or checks whether or not the robot R specified by the robot ID is executing any of the tasks such as porter's task (step S6) based on the task information contained in the status information.

If the robot R is executing a task (step S6; Yes), the task schedule adjustment unit 342 refers to the task schedule table 230 and confirms or checks whether the task for moving the robot R to the target traveling area (battery charging task) has been registered (reserved) in the task schedule of the robot R (step S7).

If the battery charging task has not been registered in the task schedule (step S7; No), the task schedule adjustment unit 342 generates necessary data required for registration of the battery charging task in the task information database 220, and registers the battery charging task in the task information database 220 based on the generated data (step S8).

To be more specific, the task schedule adjustment unit 342 refers to the task information database 220 based on the task ID contained in the battery mode information, and acquires the coordinate data indicating the task end position where the robot R completes the currently executing task and the data indicating the expected task finish time (end time of the task) as well as acquires the coordinate data of the target traveling area from the battery mode information.

Subsequently, the task schedule adjustment unit 342 registers the battery charging task in the task information database 220 with the coordinate data indicative of the task end position and the data indicative of the end time of the task as the coordinate data indicative of the start position for the battery charging task and the data indicative of the start time for the battery charging task, respectively. While doing so, the task schedule adjustment unit 342 sets the priority value for the highest priority value among those of the information items of the battery charging task, and then specifies the robot R for carrying out the task from the robot ID and registers the battery charging task.

At the same time, the task schedule adjustment unit 342 generates a signal indicating that the task information database 220 has been updated (task update signal), and transmits the generated task update signal to the priority data generator 320. This allows the priority of each task that is registered in the task information database 220 to be reset or reassigned, and the task schedule production unit 341 sets (rearrange) the task schedule in accordance with the above process and based on the thus reset priority.

With reference to FIGS. 9, 10(a) and 10(b), the process carried out in the task schedule adjustment unit 342 will be explained by way of example, where the battery charging task is added to or inserted into the task schedule of the robot R that is specified by the robot ID number '1'. The task schedule adjustment unit 342 refers to the data of the information items for the task currently being executed by the robot R (task ID number '10'; see FIG. 9), and registers the battery charging task including the content of the information item indicated by the task ID number '18' into the task information database 220.

As is obvious from FIG. 9, the end position of the task that is indicated by the task ID number '10' is set for the start position of the battery charging task (task ID number '18') and the end time of the task that is indicated by the task ID number '10' is set for the start time of the battery charging task (task ID number '18'), respectively. Further, it can be seen that the priority is set for '9' as the highest priority value and that the robot ID (ID number '1') is input in the column of the information item indicating the robot ID as an identifier for specifying the robot R.

As a result, as seen in FIGS. 10(a) and 10(b), the task specified by the task ID number '18' is registered in the task information database 220, and thereafter the battery charging task is added to or inserted into the task schedule of the robot R that is specified by the robot ID number '1' when the task schedule production unit 341 resets or rearranges the task schedule. Therefore, the contents of the task schedule table as shown by FIG. 10(a) at a time before the insertion of the battery charging task is updated to the contents as shown by FIG. 10(b).

Meanwhile, if the robot R specified by the robot ID is not executing any of the tasks (step S6; No), the task schedule adjustment unit 342 refers to the task schedule table 230 and confirms or checks whether or not the task for moving the robot R to the target traveling area (i.e., battery charging task) has been registered in the task schedule of the robot R (step S9).

If the battery charging task has been registered (step S9; Yes), in order to make the robot R execute the battery charging task that is reserved in the task schedule table 230, the task schedule adjustment unit 342 transmits to the executive instruction generator 350 the executive instruction request signal (see FIG. 6). Therefore, the executive instruction generator 350 generates the executive instruction requesting the robot R to execute the battery charging task and transmits the same to the robot R.

If the battery charging task has not been registered (step S9; No), the task schedule adjustment unit 342 transmits to the executive instruction generator 350 the executive instruction request signal (battery charging signal) requesting generation of the executive instruction for instructing the robot R to execute the battery charging task.

When transmitting the battery charging signal, the task schedule adjustment unit 342 acquires necessary data (battery charge-related data) required for the robot R specified by the robot ID to move to the battery charge area, such as the coordinate data indicative of the current position of the robot R, the coordinate data indicative of the target traveling area, etc. from the battery mode information input from the battery level determination unit 333. The task schedule adjustment unit 342 then transmits the acquired necessary data together with the battery charging signal to the executive instruction generator 350.

Accordingly, the executive instruction generator 350 generates the executive instruction for instructing the robot R to execute the battery charging task, and transmits the same to the robot R.

In the Case of Mode 3

If the statement of the battery indicated by the battery mode information is in mode 3 (step S15; Yes), the task schedule adjustment unit 342 confirms or checks whether or not the robot R specified by the robot ID is executing a task (step S16) based on the task information contained in the status information.

If the robot R is executing a task (step S16; Yes), the task schedule adjustment unit 342 transmits to the executive instruction generator 350 the executive instruction request signal (task stop signal) requesting generation of the executive instruction for instructing the robot R to stop the currently executing task (step S17).

Subsequently, the task schedule adjustment unit 342 transmits to the executive instruction generator 350 the executive instruction request signal (compulsory battery charging signal) requesting generation of the executive instruction for compulsorily instructing the robot R to execute the battery charging task (step S118).

When transmitting the compulsory battery charging signal, the task schedule adjustment unit 342 acquires necessary data (battery charge-related data) required for the robot R specified by the robot ID to move to the battery charge area, such as the coordinate data indicative of the current position of the robot R, the coordinate data indicative of the target traveling area, etc. from the battery mode information input from the battery level determination unit 333. The task schedule adjustment unit 342 then transmits the acquired necessary data together with the battery charging signal to the executive instruction generator 350.

If the robot R is not executing a task (step S16; No), the task schedule adjustment unit 342 transmits the compulsory battery charging signal and the battery charge-related data to the executive instruction generator 350 (step S18).

Accordingly, the robot R is forced to execute the battery replacement task based on the executive instruction generated in the executive instruction generator 350 to be described later.

In the Case of Mode 4

If the statement of the battery indicated by the battery mode information is in mode 4 (step S15; No), the task schedule adjustment unit 342 generates the signal (emergency signal request signal) requesting the executive instruction generator 350 to generate the signal (emergency signal) for informing the administrator about the fact that the robot R neither can execute the task nor move to the battery charge area. The task schedule adjustment unit 342 then transmits the emergency signal request signal to the executive instruction generator 350.

Executive Instruction Generator

The executive instruction generator 350 generates executive instructions (data) requesting the robots R to execute tasks.

If the executive instruction generator 350 receives the signal requesting the generation of the executive instruction (executive instruction request signal) from the database manager 310 or the task schedule adjustment unit 342, the executive instruction generator 350 refers to the task schedule table 230 based on the robot ID contained in the received executive instruction request signal, and confirms or checks the tasks that has been registered in the task schedule table 230.

Subsequently, if there are unexecuted tasks assigned to the robot R specified by the robot ID, the executive instruction generator 350 generates an executive instruction (data) requesting the robot R to execute the tasks with reference to the data of the information items in the task information database 220. The executive instruction generator 350 then transmits the generated executive instruction to the robot R specified by the robot ID through the input/output device 100.

Further, if the executive instruction generator 350 receives the executive instruction request signal requesting generation of the executive instruction for instructing the robot R to stop the currently executing task (task stop signal) from the task schedule adjustment unit 342, the executive instruction generator 350 generates an executive instruction (data) for instructing the robot R to stop the currently executing task. The executive instruction generator 350 then transmits the generated executive instruction (data) to the robot R specified by the robot ID through the input/output device 100.

Furthermore, if the executive instruction generator 350 receives the executive instruction request signal requesting generation of the executive instruction for instructing the robot R to execute the battery charging task (compulsory battery charging signal; battery charging signal) and the battery charge-related data from the task schedule adjustment unit 342, the executive instruction generator 350 generates the executive instruction (data) for causing the robot R to execute the battery charging task. The executive instruction generator 350 then transmits the generated executive instruction (data) to the robot R specified by the robot ID through the input/output device 100.

Accordingly, the robot R which receives the executive instruction executes the task (battery charging task) defined by the executive instruction.

<Process in Robot Control Apparatus 3>

With reference mainly to FIGS. 5 and 11, the process carried out in the robot control apparatus 3 will be described upon determination of whether or not the battery charging task should be added to the task schedule of the robot R.

Firstly, the status information transmitted from the robot R is input into the battery level determination device 330 through the input/output device 100 of the robot control apparatus 3. The battery charge determination unit 331 of the battery level determination device 330 then refers to the task information T and the robot ID contained in the status information, and confirms or checks whether or not the robot R specified by the robot ID is executing the battery charging task (step S1).

If the robot R is executing the battery charging task (step S1; Yes), the robot control apparatus 3 finishes the data processing.

However, if the robot R is not executing the battery charging task (step S1; No), the battery charge determination unit 331 acquires the data indicating the remaining amount of charge in the battery (remaining battery charge data) from the battery information contained in the status information. The battery charge determination unit 331 then compares the acquired remaining battery charge data with the first threshold (step S2).

If the value indicated by the remaining battery charge data is equal to or higher than the first threshold (step S2; Yes), the battery charge determination unit 331 finishes the process.

Meanwhile, if the remaining amount of charge in the battery is smaller than the first threshold (step S2; No), the battery charge determination unit 331 inputs the status information from the input/output device 100 to the battery charge area selection unit 332.

The battery charge area selection unit 332 selects a battery charge area where the robot R charges the battery among a plurality of battery charge areas previously set in the task execution area, and sets the selected battery charge area as the target traveling area (step S3).

In this instance, if the robot R is not executing any of the tasks other than the battery charging task, the battery charge area selection unit 332 acquires the coordinate data indicative of the current position of the robot R (current position data) from the position information contained in the status information, and sets the target traveling area based on the acquired current position data. However, if the robot R is executing any of the tasks, the battery charge area selection unit 332 acquires the task ID from the task information contained in the status information, refers to the task information database 220 based on the task ID, and acquires the coordinate data indicative of the position (end position of the task) at which the robot R finishes the currently executing task (i.e., task end position data). The battery charge area selection unit 332 then sets the target traveling area based on the acquired task end position data.

In order to confirm whether or not the remaining amount of charge in the battery is sufficient for the robot R to move to the target traveling area that is set in step S3 after the robot R completes the currently assigned tasks, the battery level determination unit 333 compares the remaining battery charge data with the second threshold (step S4).

If the remaining amount of charge in the battery of the robot R is equal to or higher than the second threshold, i.e., if the remaining amount of charge is sufficient (step S4; Yes), the battery level determination unit 333 generates information (battery mode information) indicating that the battery level is in mode 1 and transmits the same to the task manager 340.

If the remaining amount of charge in the battery of the robot R is smaller than the second threshold (step S4; No), the battery level determination unit 333 compares the remaining battery charge data with the third threshold (step S5), so as to confirm whether or not the remaining amount of charge in the battery is barely sufficient for the robot R to move to the target traveling area that is set in step S3 after the robot R completes the currently assigned tasks.

If the remaining amount of charge in the battery of the robot R is equal to or higher than the third threshold, i.e., if the remaining amount of charge is barely sufficient (step S5; Yes), the battery level determination unit 333 generates information (battery mode information) indicating that the battery level is in mode 2 and transmits the same to the task manager 340.

The task manager 340 then confirms or checks whether or not the robot R specified by the robot ID is executing a task (step S6).

If the robot R is executing a task (step S6; Yes), the task manager 340 confirms or checks whether or not the battery charging task has been registered in the task schedule of the robot R (step S7). If the battery charging task has been registered (step S7; Yes), then the task manager 340 finishes the process.

Meanwhile, if the battery charging task has not been registered (step S7; No), then the task manager 340 registers the battery charging task in the task information database 220 (step S8).

If the robot R is not executing a task (step S6; No), the task manager 340 confirms or checks whether or not the battery charging task has been registered in the task schedule (step S9). If the battery charging task has been registered (step S9; Yes), the executive instruction for instructing the robot R to execute the reserved battery replacement task is transmitted from the executive instruction generator 350 to the robot R specified by the robot ID (step S10). Subsequently, when the signal indicative of receipt of the executive instruction by the robot R (acknowledgment signal) is transmitted from the robot R, the task information database 220 is updated by the database manager 310 (step S11).

Meanwhile, if the battery charging task has not been registered (step S9; No), the task manager 340 causes the executive instruction generator 350 to transmit the executive instruction (data) for executing the battery charging task to the robot R specified by the robot ID (step S12). Subsequently, when the signal indicative of receipt of the executive instruction by the robot R (acknowledgment signal) is transmitted from the robot R, the task information database 220 is updated by the database manager 310 (step S13).

If the remaining amount of charge in the battery of the robot R is smaller than the third threshold (step S5; No), the battery level determination device 330 resets or replaces the target traveling area for the substituted target traveling area based on the current position of the robot R. Subsequently, the battery level determination device 330 calculates the amount of battery expense required for the robot R to move from the current position to the target traveling area that is set in step S3 and the amount of battery expense required for the robot R to move from the current position to the substituted target traveling area, and compares them. If the amount of battery expense required for the robot R to move to the substituted target traveling area is smaller than the amount of battery expense required for the robot R to move to the target traveling area, the battery level determination device 330 resets or replace the substituted target traveling area for the target traveling area. However, if the amount of battery expense required for the robot R to move to the substituted target traveling area is more than the amount of battery expense required for the robot R to move to the target traveling area, the battery level determination device 330 reuses the target traveling area set in step S3 as the target traveling area (step S14).

In order to confirm whether the remaining amount of charge in the battery is barely sufficient for the robot R to move from the current position (current location of the robot R) to the target traveling area set in step S14, the battery level determination device 330 compares the remaining battery charge data and the fourth threshold (step S15).

If the remaining amount of charge in the battery of the robot R that is specified by the robot ID is equal to or higher than the fourth threshold (step S15; Yes), the task manager 340 confirms or checks whether or not the robot R specified by the robot ID is executing a task (step S16).

If the robot R is executing a task (step S16; Yes), the task manager 340 causes the executive instruction generator 350 to transmit the executive instruction (data) for stopping execution of the task to the robot R specified by the robot ID (step S17).

If the robot R is not executing a task (step S16; No), the task manager 340 generates the executive instruction (data) for compulsorily executing the battery charging task, and transmits the same to the robot R specified by the robot ID through the input/output device 100 (step S18).

If the remaining amount of charge in the battery of the robot R that is specified by the robot ID is smaller than the fourth threshold (step S15; No), the task manager 340 makes the emergency signal for informing the administrator about the fact that the robot R neither can execute the task nor move to the target traveling area output through the input/output device 100.

Although the preferred embodiment of the present invention has been described above, the present invention is not limited to this specific embodiment. It is to be understood that various changes or modifications may be made without departing from the scope of the present invention.

For example, in the above embodiment, if the battery level determination device 330 determines that the battery level is in mode 3 while the robot R is executing a task, the currently executing task is stopped and the battery charging task is carried out instead. In this instance, the task schedule adjustment unit 342 may register the stopped task for the highest priority in the task information database and transmit the task update signal to the priority data generator 320.

In this instance, since the stopped task can be preferentially assigned to another robot R, it is possible to execute the stopped task in a reliable manner. This is particularly preferable if the stopped task is a task (guide task) in which the robot R conducts a visitor to a certain place.

As described previously, the robot control apparatus according to the present invention allows a plurality of tasks having different priorities to be effectively performed using a plurality of robots.

Further, while confirming or checking the remaining amount of charge in the battery of a robot R on an as-needed basis so as to confirm whether or not the robot R requires battery charge, if the battery charge is necessary, the robot control apparatus causes the robot R to execute a task for the battery charge as well as rearranges a task executive plan (task schedule) assigned to each robot R, by which tasks assigned to the robot R that requires battery charge can be assigned to other robots R.

Therefore, it is possible to control a plurality of robots to effectively perform a plurality of tasks even in the condition where an unexpected factor such as human interaction response exists.

What is claimed is:

1. A robot control apparatus for controlling tasks to be executed by a plurality of robots which are capable of moving, comprising:
   a battery level determination device which determines a battery level of each robot from a predetermined plurality of battery levels based on a remaining amount of charge in a battery of each robot;
   a task manager which sets a task executive plan to be executed by each robot for the plurality of robots and rearranges the task executive plan for one or more tasks registered in the task executive plan in accordance with a process predetermined for each battery level;
   an executive instruction generator which generates executive instructions requesting the robots to execute the tasks that are set in the task executive plans; and
   a transmitter which transmits the executive instructions to the robots,
   wherein the task manager comprises
      a task schedule production unit to determine which robot carries out a battery charging task based on a priority determined for each task and determine the order of execution of the tasks assigned to each robot which is not carrying out the battery charging task, and
      a task schedule adjustment unit to rearrange task executive plans in accordance with a process determined for each battery level to make a reservation for the battery charging task or make the robot execute the battery charging task,
   wherein the battery level determination device comprises
      a battery charge determination unit determining whether or not the battery of each robot requires charge in accordance with the remaining amount of charge in the battery,
      a battery charge area selection unit selecting, among a plurality of battery charge areas to be set in advance, and then setting the selected battery charge area as the target traveling area of the robot if the battery charge is necessary, and
      a battery level determination unit comparing the remaining battery charge data indicative of the remaining amount of charge in the battery with a threshold that is calculated at least in consideration of one of the amount of battery expense required for the robot to complete the currently executing task, and the amount of battery expenses required for the robot to move to the target traveling area, and determining which one of the battery level the status of the battery belongs to.

2. A robot control apparatus according to claim 1, wherein when the task manager rearranges the tasks registered in the task executive plan, the task manager registers one or more tasks that are determined to be difficult for execution in one or more task executive plans of other robots.

3. A robot control apparatus according to claim 1, wherein the battery charge area selection unit sets the target traveling area based on a current position of the robot or a task end position where the robot finishes the currently executing task.

4. A robot control apparatus according to claim 1, wherein if the battery charge determination unit determines that the robot requires battery charge, the task manager registers a traveling task requesting the robot to move to the target traveling area in the task executive plan of the robot.

* * * * *